(12) United States Patent
Chu et al.

(10) Patent No.: US 9,104,430 B2
(45) Date of Patent: Aug. 11, 2015

(54) SYSTEM AND METHOD FOR ENABLING EXTENSIBILITY IN SENSING SYSTEMS

(75) Inventors: Maurice K. Chu, San Mateo, CA (US); Juan Liu, Milpitas, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1615 days.

(21) Appl. No.: 12/029,414

(22) Filed: Feb. 11, 2008

(65) Prior Publication Data
US 2009/0204370 A1    Aug. 13, 2009

(51) Int. Cl.
G06F 9/445 (2006.01)
G06F 15/177 (2006.01)
G06F 9/44 (2006.01)
H04L 29/08 (2006.01)
G06F 9/50 (2006.01)
H04L 12/24 (2006.01)

(52) U.S. Cl.
CPC ............... *G06F 9/4411* (2013.01); *G06F 8/61* (2013.01); *G06F 9/5066* (2013.01); *H04L 29/08558* (2013.01); *H04L 41/0813* (2013.01)

(58) Field of Classification Search
None
See application file for complete search history.

(56) References Cited

U.S. PATENT DOCUMENTS

| | | | |
|---|---|---|---|
| 7,185,287 B2 * | 2/2007 | Ghercioiu et al. | 715/771 |
| 7,313,447 B2 * | 12/2007 | Hsiung et al. | 700/9 |
| 7,340,737 B2 * | 3/2008 | Ghercioiu et al. | 717/171 |
| 7,346,891 B2 * | 3/2008 | Anand et al. | 717/107 |
| 7,395,195 B2 * | 7/2008 | Suenbuel et al. | 703/13 |
| 7,423,527 B2 * | 9/2008 | Bajwa et al. | 340/539.16 |
| 7,756,801 B2 * | 7/2010 | Reich et al. | 706/45 |
| 8,131,838 B2 * | 3/2012 | Bornhoevd et al. | 709/224 |
| 8,364,786 B2 * | 1/2013 | Pandey et al. | 709/220 |
| 8,396,788 B2 * | 3/2013 | Anke | 705/38 |
| 8,818,346 B2 * | 8/2014 | Frank | 455/418 |
| 2004/0006761 A1 * | 1/2004 | Anand et al. | 717/101 |
| 2005/0198228 A1 * | 9/2005 | Bajwa et al. | 709/220 |
| 2006/0052882 A1 * | 3/2006 | Kubach et al. | 700/11 |
| 2006/0112396 A1 * | 5/2006 | Reich et al. | 719/313 |
| 2006/0142978 A1 * | 6/2006 | Suenbuel et al. | 703/1 |

(Continued)

OTHER PUBLICATIONS

Bestavros, A., et al., "SNBench: A Development and Run-time Platform for Rapid Deployment of Sensor Network Applications," 2nd Int'l Conf. on Broadband Networks [online], 2006 [retrieved Mar. 20, 2015], Retrieved from Internet: <URL: http://ieeexplore.ieee.org/xpls/abs_all.jsp?arnumber=1589708>, pp. 34-43.*

*Primary Examiner* — Don Wong
*Assistant Examiner* — Todd Aguilera
(74) *Attorney, Agent, or Firm* — Shun Yao; Park, Vaughan, Fleming & Dowler LLP

(57) ABSTRACT

One embodiment of the present invention provides a method and apparatus for enabling extensibility in sensing systems. The distributed sensing system comprises a number of sensor nodes, a device database, a sensing module registry, a sensing needs monitor, and an automatic composer. The device database is in communication with at least one sensor node and configured to maintain physical information on at least one sensor node. The sensing module registry is configured to maintain a registry of a number of software modules that are available for extracting information from sensor data. The sensing needs monitor is configured to maintain a list of context pairs that represent a number of sensing needs of a sensing application. The automatic composer is configured to generate a composition of software modules, at runtime, to realize the sensing needs of users and applications.

20 Claims, 12 Drawing Sheets

(56) References Cited

U.S. PATENT DOCUMENTS

| | | | |
|---|---|---|---|
| 2006/0259163 A1* | 11/2006 | Hsiung et al. | 700/30 |
| 2006/0271661 A1* | 11/2006 | Qi et al. | 709/223 |
| 2007/0143452 A1* | 6/2007 | Suenbuel et al. | 709/220 |
| 2007/0233881 A1* | 10/2007 | Nochta et al. | 709/228 |
| 2007/0283002 A1* | 12/2007 | Bornhoevd et al. | 709/224 |
| 2008/0016436 A1* | 1/2008 | Liu et al. | 715/212 |
| 2008/0016440 A1* | 1/2008 | Liu et al. | 715/700 |
| 2008/0306798 A1* | 12/2008 | Anke et al. | 705/8 |

* cited by examiner

SYSTEM AND METHOD FOR ENABLING EXTENSIBILITY IN SENSING SYSTEMS

BACKGROUND

1. Field of the Invention

The present invention relates to techniques for enabling extensibility in sensing systems. More specifically, the present invention relates to a technique for generating and deploying a composition of software modules onto a sensing system to realize a sensing application.

2. Related Art

Intelligent sensing systems promise to provide superior services by increasing accuracy and adding context to computational decisions. However, today's systems are costly to design, difficult to extend, and are unnecessarily expensive. The problem is the rigidity and lack of extensibility of today's sensor systems. Sensors are typically deployed and engineered for a single purpose with little regard for other future uses of the same data. This often results in multiple sensing systems occupying the same space, but completely unable to share sensor nodes or data.

Adding functionality into existing systems that were never designed to be extended can be a complicated and costly task where deploying a separate system with its own set of sensor nodes is often the simpler, more reliable, and economical choice. This results in the shortsighted "reinvent versus reuse" design methodology—multiple, isolated sensing systems that cannot be adapted or extended in a robust and reliable way.

SUMMARY

One embodiment of the present invention provides a distributed sensing system. The distributed sensing system includes a number of sensor nodes, a device database, a sensing module registry, a sensing needs monitor, and an automatic composer. The device database is in communication with at least one sensor node and configured to maintain physical information on at least one sensor node. The sensing module registry is configured to maintain a registry of a number of software modules that are available for extracting information from sensor data. The sensing needs monitor is configured to maintain a list of context pairs that represent a number of sensing needs of a sensing application. The automatic composer is configured to generate a composition of software modules, at runtime, to realize the sensing needs of users and applications. Furthermore, the automatic composer is coupled to the device database, the sensing module registry, the sensing needs monitor, and the number of sensor nodes.

In a variation on this embodiment, a respective sensor node includes one or more sensing devices to detect one or more of: a sound signal, motion signal, vibration signal, altitude signal, luminous intensity signal, proximity signal, pressure signal, temperature signal, radiation signal, timing signal, humidity signal, electromagnetic field intensity signal, altitude signal, weight signal, airborne particulates signal, velocity signal, direction signal, and distance signal.

In a variation on this embodiment, the automatic composer is further configured to report when an existing sensor node configuration does not provide sufficient sensor coverage for realizing the sensing requirements of users and applications.

In a variation on this embodiment, a respective context pair represents sensing information as a name-location pair of the form:

<name, location>.

The "name" field indicates a type of data or information on which the sensing information is based, and the "location" field indicates a point or region on which the sensing information is based.

In a variation on this embodiment, a respective context pair represents sensing information as a name-spatiotemporal pair of the form:

<name, location/time>.

The "name" field indicates a type of data or information on which the sensing information is based. Furthermore, the "location/time" field indicates a point or region, and a time, on which the sensing information is based.

In a variation on this embodiment, the sensing needs monitor is configured to interface with a graphical user interface (GUI), and the GUI is configured to allow users to insert and delete context pairs.

In a variation on this embodiment, the physical information maintained by the device database describes sensor-specific calibration information, which includes lens distortion coefficients, orientation of cameras, and/or location of sensor nodes.

In a variation on this embodiment, the automatic composer is further configured to generate a composition of software modules, at runtime, to realize the sensing needs of users and applications. The automatic composer generates a composition by determining the necessary software modules and sensor nodes for achieving the sensing needs, and by also determining the necessary number of a respective type of software module, the configurations, and on which sensor nodes to instantiate the software modules. Once the automatic composer generates a composition, it configures the sensor nodes to execute the composition.

In a variation on this embodiment, when a sensor node failure is detected, the automatic composer is configured to generate a new composition of software modules, at runtime, using only the available sensor nodes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Introduction

An integrated, extensible system has several advantages. With the ability to extend the functionality of sensor nodes, redundant deployment of sensor nodes can be avoided. This means that the upfront cost of hardware deployment and software development can be amortized over multiple applications over the lifetime of the system. The availability of more sensor nodes configured with a variety of sensing devices can increase performance through sensor node diversity. With such diversity, sensing becomes more accurate and delivers better performance.

Designing extensible systems involves maintaining a simplified infrastructure of sensor nodes while increasing the system functionality. In practice, maintaining simplicity is a challenging task due to the gradual loss of system expertise over time as developers leave, move on to other projects, or forget fundamental details.

This disclosure describes a design framework that leverages the key role of physical location in sensing to simplify construction of extensible systems by use of an automatic composition service that automatically integrates and reconfigures software components on devices as the system evolves. This system provides extensibility to the sensing aspects of applications.

When multiple developers independently develop their respective sensing applications, it is often difficult to reuse sensing devices and functionalities across multiple applications. A respective sensing application is built from scratch with little consideration of how it could be reused by other applications. The disparate sensing networks coexist but are inaccessible to one another. From a development cost perspective, it is more cost effective to reuse existing applications and extend functionality whenever possible.

Sensor System

Figure 1:
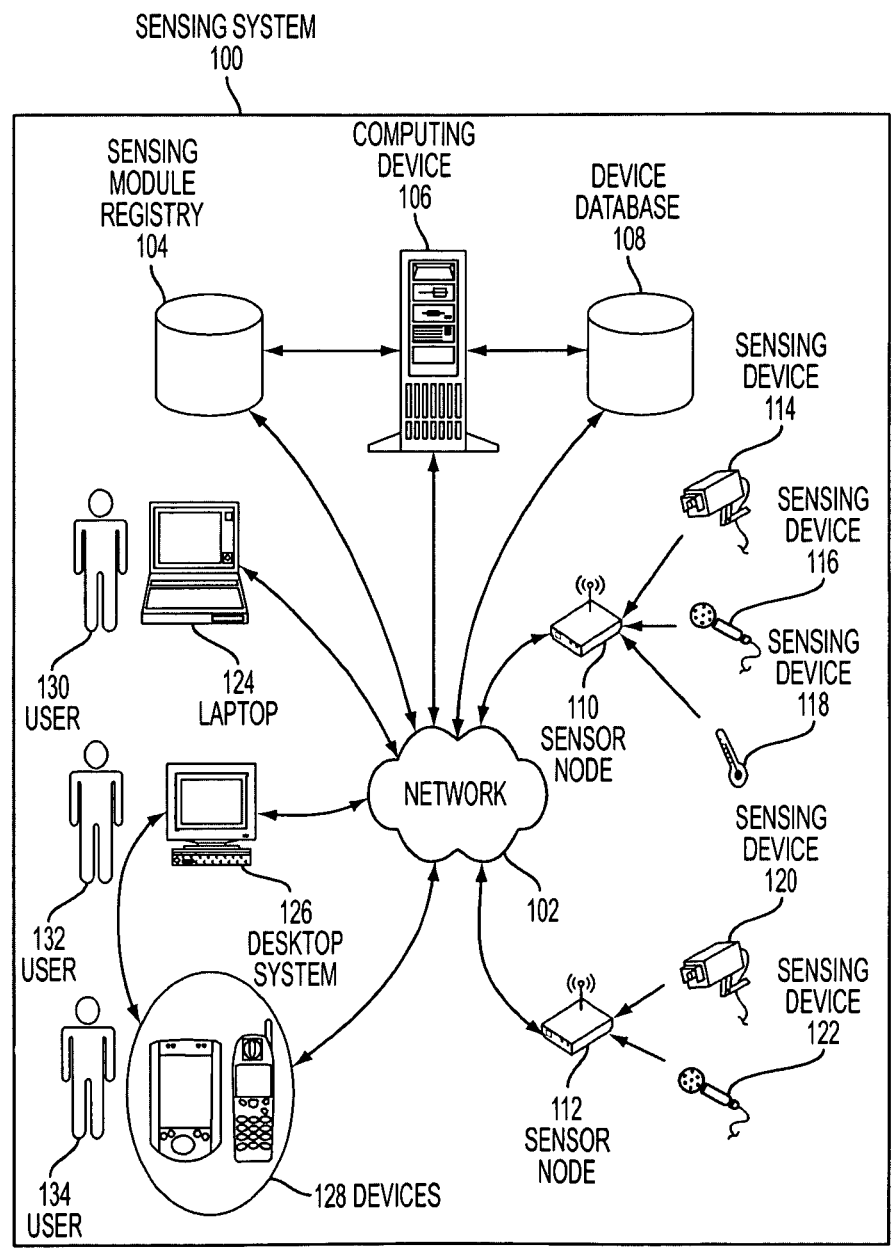
FIG. 1 presents an exemplary architecture for a computing environment which includes a sensor system in accordance with an embodiment of the present invention.

FIG. 1 presents a sensing system 100 in accordance with embodiments of the present invention. Sensing system 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, sensing system 100 includes network 102, computing device 106, sensing module registry 104, device database 108, sensor nodes 110-112, sensing devices 114-122, laptop 124, desktop system 126, and devices 128.

Network 102 can include any type of wired or wireless communication channel capable of coupling together computer nodes. This includes, but is not limited to, a local area network, a wide area network, or a combination of networks. In one embodiment of the present invention, network 102 includes the Internet. In some embodiments of the present invention, network 102 includes phone and cellular phone networks.

Sensing devices 114-122 can include cameras, microphones, motion detectors, ultra-wideband (UWB) sensors, infrared sensors, magnetometers, thermometers, barometers, weight scales, and other types of sensors that detect sound, motion, vibration, luminosity, magnetic field intensity, proximity, pressure, temperature, radiation, timing, humidity, altitude, weight, airborne particulates, velocity, direction, and other properties and/or combinations of properties.

Sensor node 110 or 112 can include a memory (e.g., a predetermined amount of RAM) for storing information and a mechanism for executing software modules. A software module is a software unit that accepts data input from a sensing device and/or from a number of software modules, and performs computations on this input to produce a specific output. In one embodiment of the present invention, a software module produces data as an output. In another embodiment of the present invention, a software module produces a notification to a user as an output.

Sensing system 100 senses (e.g., detects, estimates, tracks, and/or monitors) phenomena using the signals observed by sensor nodes in the system. For example, sensor system 100 can sense the locations and activities of a person or object (e.g., tracking an elderly person and determining his/her location and movements) or detect the occurrence of an event (e.g., a fire in the kitchen).

Sensing module registry 104 is configured to maintain a registry of a number of software modules that are available for extracting information from sensor data. Device database 108 is in communication with at least one sensor node, and is configured to maintain physical information on at least one sensor node. Computing device 106 can be configured to include a sensing needs monitor 204 and an automatic composer 202, which are described in conjunction with FIG. 2.

In one embodiment of the present invention, computing device 106 includes sensing module registry 104 and/or device database 108. In an alternate embodiment of the present invention, computing device 106 is coupled to sensing module registry 104 and/or device database 108.

Laptop 124 and desktop system 126 can generally include any node on a network including computational capability and including a mechanism for communicating across the network.

Devices 128 can be any type of electronic device that can couple to a client, such as desktop system 126, or a network, such as network 102, to interface with computing device 106. Such devices include, but are not limited to, cell phones, Personal Digital Assistants (PDAs), smart-phones, or any other device that can be used to interact with sensing system 100.

Users 130-134 can include an individual, a group of individuals, an organization, a group of organizations, a computing system, a group of computing systems, or any other entity that can interact with sensing system 100.

Note that different embodiments of the present invention may use different configurations, and are not limited to the configuration illustrated in sensing system 100. In some embodiments of the present invention, the system is implemented as an application executing as a web-service on computing device 106, while in other embodiments of the present invention, the system is implemented as an application executing on laptop 124, desktop system 126, or devices 128. Also, note that users 130-134 may access the system via various devices, such as via computing device 106, laptop 124, desktop system 126, or devices 128.

Automatic Composition Service

Figure 2:
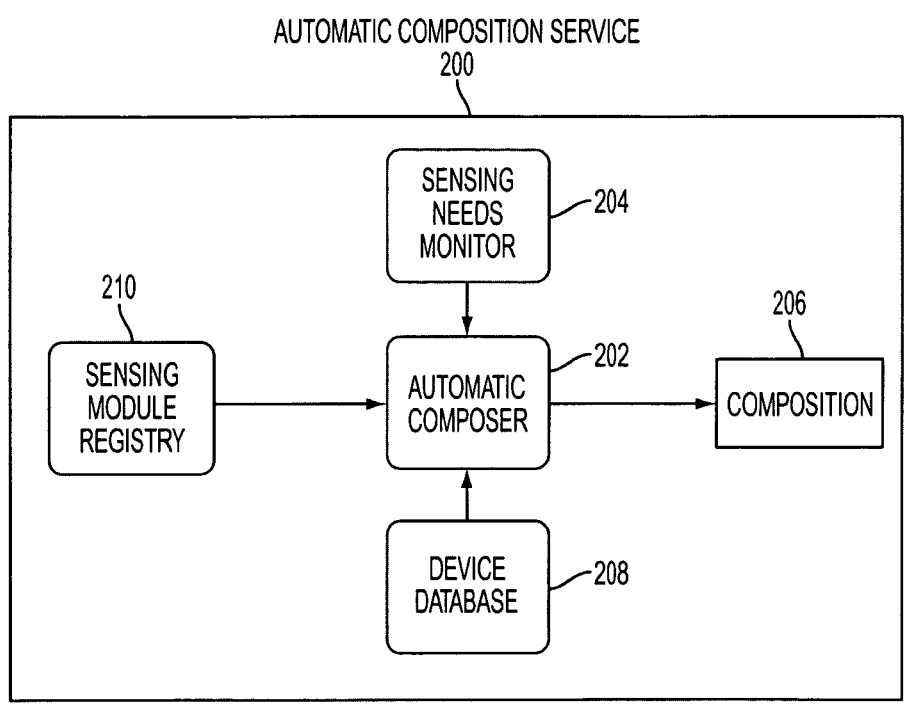
FIG. 2 presents a diagram illustrating the operation of an automatic composition service in accordance with an embodiment of the present invention.

FIG. 2 presents a diagram illustrating the operations of an automatic composition service 200 in accordance with an embodiment of the present invention. Automatic composition service 200 includes four modules: an automatic composer 202, a sensing needs monitor 204, a sensing module registry 210, and a device database 208. Automatic composer 202 produces a composition 206, which is a detailed plan that implements a sensing application by deploying a set of software modules onto a set of sensor nodes. Composition 206 includes a set of software modules to be instantiated, the identities of a set of sensor nodes on which a respective software module is to be instantiated, and a set of interfaces to be established between the instantiated software modules.

Sensing needs monitor 204, sensing module registry 210, and device database 208 maintain information about the sensing needs of the application, the available sensing software modules, and the state of physical deployment of sensor nodes on the network respectively. Automatic composer 202 uses this state information to command the processing and communications tasks that should be occurring in the networked sensing system by performing three tasks. First, it acts as a broker that determines the software modules and sensor nodes that are required to fulfill the sensing needs. Second, it acts as an architect to determine how many of a respective software module is required, how they should be configured to interface with other software modules, and on which sensor nodes to instantiate them. Finally, it dispatches this plan in the form of composition 206 to command the devices to execute it.

Sensing Needs Monitor

Sensing needs monitor 204 maintains a list of name-location pairs that represent the current sensing needs of an application. A GUI interfaces with this subservice so that users can directly insert and delete the sensing information they intend the system to gather. Also, applications can programmatically insert and delete name-location pairs with this subservice. In one embodiment, the information stored in this subservice is denoted $$A=\{A_i\}_{i=1}^{L}$$

where L is the number of name-location pairs and $A_i$ is the $i^{th}$ name-location pair.

Two functions are defined, name(A) and location(A), which return the name and location respectively of a name-location pair A.

Sensing Module Registry

Sensing module registry 210 maintains a registry of all software modules that are available for extracting information from sensor data. Sensing module registry 210 stores the actual code and meta data such as the description of valid inputs and outputs of a respective software module. When a new software module is to be added to the system, it is added to sensing module registry 210. In one embodiment, the information stored in this subservice is denoted $$F=\{F_i(x)\}_{i=1}^{M}$$

where M is the number of software modules, and where $F_i(x)$ is the $i^{th}$ software module. The expression for F also illustrates the explicit dependence of a respective sensing module on a location region x.

To enable automatic composition, several functions are defined by the developer to provide meta data associated with software module F.

n=outputName(F)—This function returns the name n of the output of software module F. A software module may only output one name.

$(n_i,x_i)_{i=1}^{K}$=inputPairs(F, $x_{out}$)—This function returns a set of name-location pairs that correspond to the required inputs for software module F to output in region $x_{out}$.

$\{\tilde{x}_i\}_{i=1}^{K}$, $\tilde{x}_{out}$=filterInputLocations(F, $x_{out}$, $(n_i, x_i)_{i=1}^{K}$)—This function is used by automatic composer 202 for performing the automatic composition task. With K inputs that have the name $n_i$ and location $x_i$, this function will return K location regions $\{\tilde{x}_i\}_{i=1}^{K}$ which correspond to the input requirements of software module F and the actual output location $\tilde{x}_{out}$ that can be computed with the inputs $\{\tilde{x}_i\}_{i=1}^{K}$.

The lowest level software modules are those that directly interface with a sensing device and deliver its raw data. For example, a CameraImager software module directly interfaces with a camera's USB driver to extract images, and outputs images named CameraImage. A sensor driver module is a special case, which is supported by two more functions.

is Driver(F)—This function returns true when software module F is a sensor driver.

inputDeviceType(F)—This function indicates the type of sensing device software module F can interface with and is only applicable when software module F is a sensor driver. For example, this can indicate USB webcams.

A respective software module is designed to be general over any location region x so it is able to compute its output over any non-deterministic set of input name-location pairs. Furthermore, a respective software module has functions defined for it that specify its personal meta data. These design characteristics enable extensibility, as well as adaptability and robustness, in a sensing system.

Device Database

Device database 208 maintains information about all devices that are associated with the sensing system and their physical location. Other sensor-specific calibration information, like lens distortion and view angle in cameras, are also maintained in this subservice. Let us represent the information stored in this subservice as $$D=\{D_i\}_{i=1}^{N}$$

where N is the number of sensing devices and $D_i$ is the $i^{th}$ sensing device.

deviceType(D)—This function returns the type of the sensing device.

coverageLocation(D)—This function returns the sensor coverage location. For example, a sensor node may include a ceiling-mounted camera that points downward so that the coverage location for the sensing device is a rectangular region on a 2-D plane, which corresponds to the field of view on the floor of the room. Other extensions to more general orientations in three dimensions will require alternate representations.

Depending on the type of sensing device, there can be a set of functions that extract calibration information about the sensing device. Such calibration parameters include but are not limited to lens distortion coefficients, location, and camera orientation.

Automatic Composer

Figure 7:
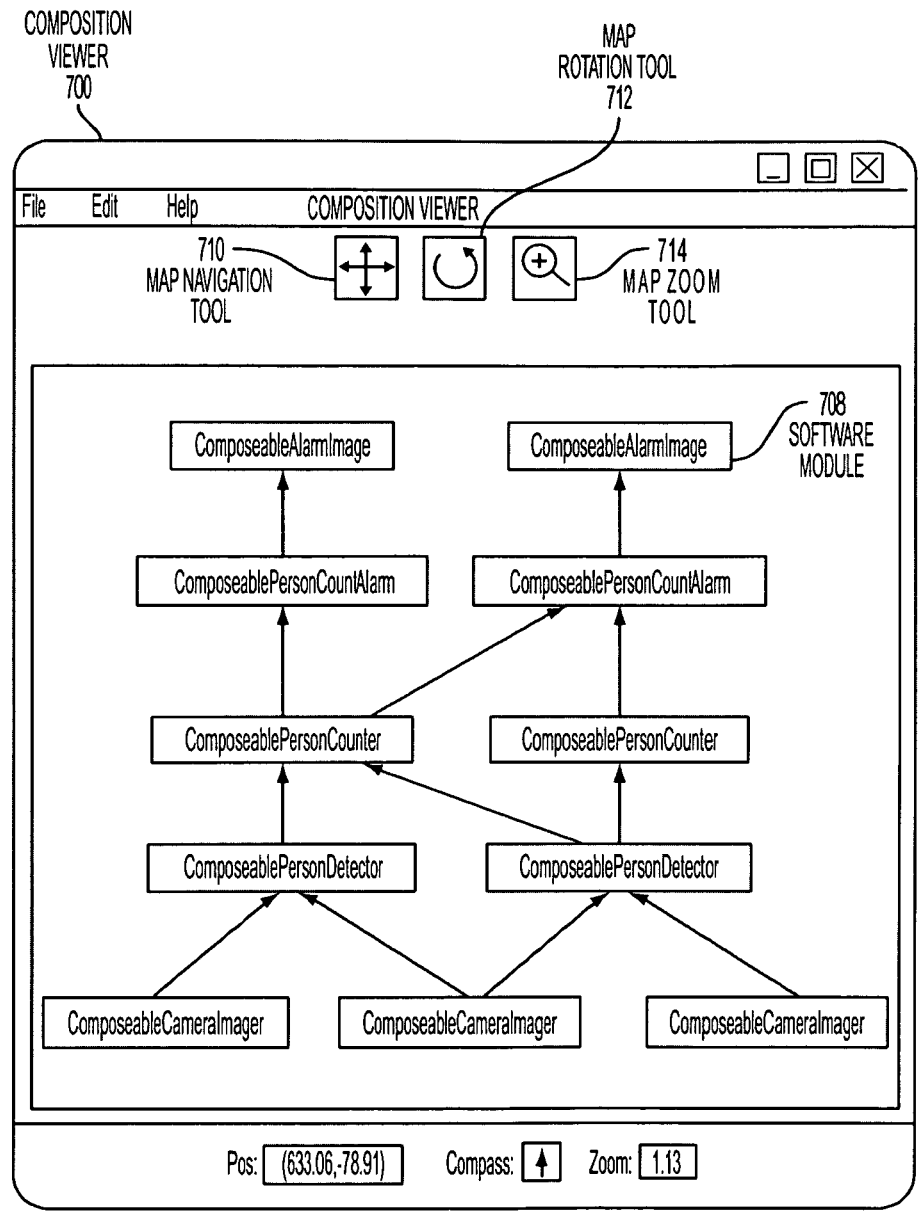
FIG. 7 presents a graphical user interface for a composition viewer in accordance with an embodiment of the present invention.

Automatic composer 202 is the core of automatic composition service 200 that takes as input the state information from sensing needs monitor 204, sensing module registry 210, and from device database 208, and generates composition 206 of software modules using the raw data from the sensing devices to satisfy the sensing needs. An example outcome of composition 206 is illustrated in FIG. 7. Composition 206 is a feed-forward directed, location-specified graph $G=(V, E, loc)$, where a respective graph node $v \in V$ represents an instance of a software module and $e=(v_1, v_2) \in E$ represents the configured interface of the output of $v_1$ to the input of $v_2$. The function $loc(v)$ of a respective graph node $v \in V$ represents the location region that is assigned to v. The purpose of the ComposeModulesFor(A) algorithm of automatic composer 202 is to construct the graph G and specify $loc(v)$ for all graph nodes v such that for a given name-location pair $A_i$ in sensing needs monitor 204, there exists a $v \in V$ that outputs sensing information with name $name(A_i)$ in the location region $location(A_i)$ using only the currently deployed sensing devices $\{D_i\}_{i=1}^{N}$ as known in device database 208 and the currently available software modules $\{F_i\}_{i=1}^{M}$. The coverage provided by the sensing devices may not be sufficient to satisfy all of the needs, so it is important for the algorithm to indicate where such coverage is lacking.

Algorithm for Composition

The following pseudo-code illustrates the algorithm ComposeModulesFor(A) for generating composition 206. The main function ComposeModulesFor(A) instantiates nodes to satisfy sensing needs A. The main function adds nodes to the current partially constructed composition G and returns the set of nodes $V_{direct}$ that directly contribute to satisfying A.

ComposeModulesFor(A)
1. Compute region $R_{remain}$ that is not being output by the current partial composition G.
   a. Search for existing nodes in G that output name(A).
      i. $V_{exist} := \{v \in G | name(v) = name(A)\}$
   b. Compute location region already covered by current composition.
      i. $R_{exist} := \cup_{v \in V_{exist}} loc(v)$
   c. Compute the remaining region.
      i. $R_{remain} := location(A) - R_{exist}$
2. If $R_{remain}$ is empty, then exit routine and return the empty set, $V_{direct} := \emptyset$.
3. Set $V_{added}$ to empty set. This variable holds which nodes have been newly added.
4. Find the set of sensing modules $F_A \subset F$ in the Sensing Module Registry that can output name(A).
   a. $F_A = \{F \in F | outputName(F) = name(A)\}$
5. For each $F \in F_A$,
   a. If is Driver(F) is true, then
      i. Find which devices can be driven by F.
         1. $D_F := \{D \in D: inputDeviceType(F) = deviceType(D)\}$
      ii. If a similar node does not already exist in G, create a new node w for each device in $D \in D_F$ with sensing module set to F and set $loc(w) := coverageLocation(D)$
      iii. If loc(w) intersects $R_{remain}$, then
         1. Add w to G and $V_{added}$.
         2. $R_{remain} := R_{remain} - location(w)$
   b. Else
      i. Pull out the set of input name-location pairs for module F.
         1. $I_F := inputPairs(F, R_{remain})$
      ii. For each input pair $I \in I_F$,
         1. $V_I := ComposeModulesFor(I)$.
            ($V_I$ is the set of nodes in the current composition that directly satisfy I.)
      iii. Construct the realized input pairs for F.
         1. $P_F := \{(name(v), loc(v)) | v \in \{V_I\}_{I \in I_F}\}$
      iv. Compute the input locations needed for $F(R_{remain})$.
         1. $X_F, R_{out} := filterInputLocations(F, R_{remain}, P_F)$
      v. If $R_{out}$ is not empty,
         1. Create a new node w with sensing module set to F and $loc(w) := R_{out}$, and add w to the current composition G.
         2. Add node w to the set $V_{added}$.
         3. For all nodes $v \in \{V_I\}_{I \in I_F}$ for which the corresponding $x \in X_F$ is not empty, add a directed edge (v, w), into G.
         4. Update $R_{remain} := R_{remain} - R_{out}$
6. If $R_{remain}$ is not empty, repeat Step 5. If $R_{remain}$ remains unchanged and still non-empty, then this indicates that there is not enough sensor coverage to satisfy sensing information with name name(A) in location region location(A). Exit routine and return $V_{direct} := V_{added} \cup V_{exist}$.
7. If $R_{remain}$ is empty, then exit routine and return $V_{direct} := V_{added} \cup V_{exist}$.

The idea for the ComposeModulesFor(A) algorithm is to begin with the desired outputs, and build the composition G backwards down to the sensing devices. At every step in the composition process, the algorithm maintains a partial composition $G=(V, E, loc)$. For a respective graph node $v \in V$, the following functions are defined.

sensingModule(v)—This function returns the software module F that is associated with node v in composition G.

name(v)—This function returns the output name of the software module associated with this node.

loc(v)—This function returns the chosen location parameter for the software module associated with v.

During composition construction, the algorithm for composition in ComposeModulesFor(A) instantiates new software modules, chooses the location parameter, and configures the input sources and output destinations of these modules.

The resulting composition G can contain nodes that do not contribute to satisfying the sensing needs A, so there is a phase to delete unnecessary nodes. Furthermore, for a networked system, the final step is to determine on which sensor nodes the software modules of the composition should be installed. Rules can be employed, such as installing as much functionality into the sensor nodes as possible, or performing various load balancing and distributed process migration techniques, which determine good placement of software modules onto distributed sensor nodes under a variety of cost criteria.

The filterInputLocations function is used to select a smaller set of available inputs to compute the output. Depending on the choice of this function, it is possible for automatic composer 202 to instantiate multiple copies of the same software module, where the individual copies operate on separate input regions if the developer designed this function to only choose a single input. In contrast, a choice that uses all of the inputs enforces that only a single copy of a software module is instantiated. The computation of $R_{remain}$ in step 5.b.v.4 of the algorithm for composition ComposeModulesFor(A) ensures that several passes are allowed so that a software module can be instantiated multiple times.

The composition algorithm presented above provides a great deal of design flexibility, such as choosing the order of node instantiation and choosing which nodes to include in composition 206. These considerations can have a large effect on the performance characteristics of the resulting composition 206. For example, a trade off between efficiency and robustness can be achieved by choosing a composition algorithm that ranges from computing minimal compositions to compositions with redundant nodes.

Sample Networked Sensing System

Figure 3:
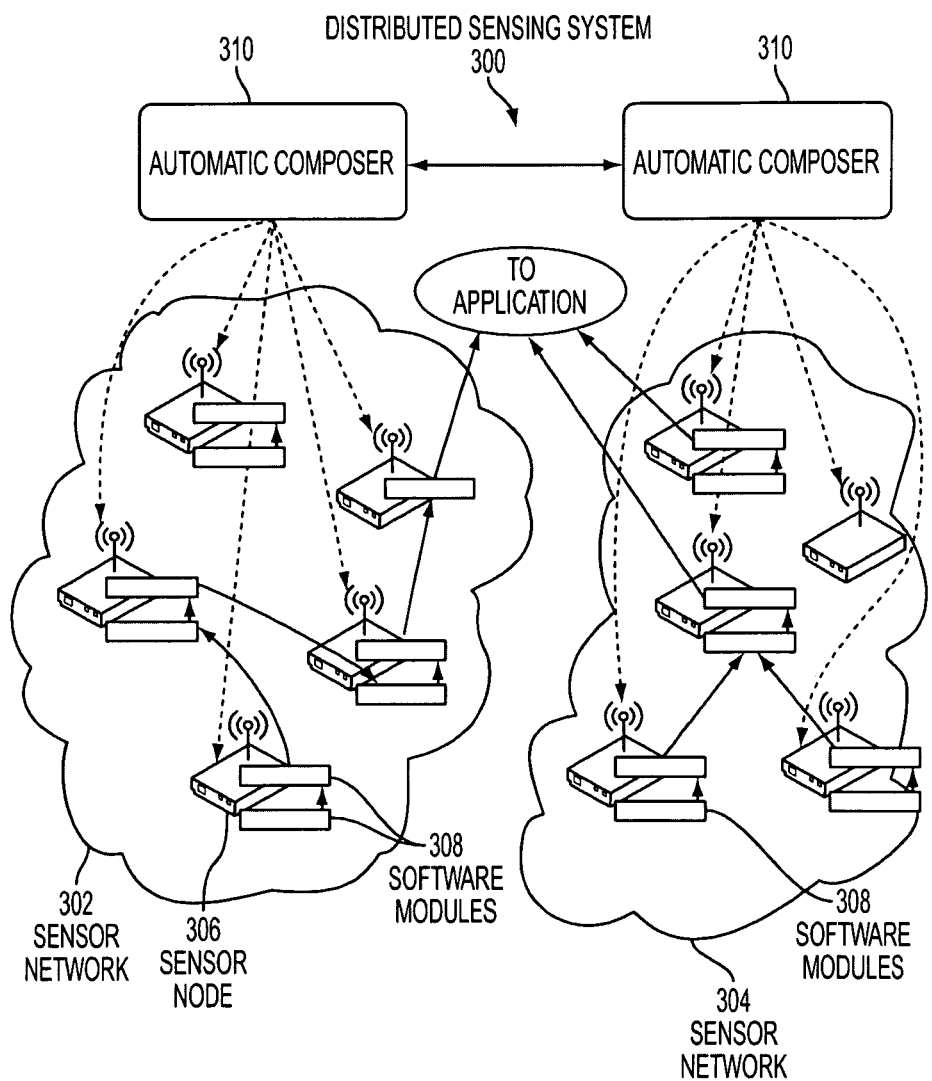
FIG. 3 presents a diagram illustrating a distributed sensing system in accordance with an embodiment of the present invention.

FIG. 3 illustrates a distributed sensing system 300 in accordance with an embodiment of the present invention. Distributed sensing system 300 includes two sensor networks: sensor network 302 and sensor network 304. Distributed sensing system 300 also includes sensor nodes 306 within sensor networks 302-304, and includes software modules 308 executing within sensor nodes 306. This architecture includes automatic composition over physical locations, and is a two-tiered system with a number of automatic composer nodes 310 and a number of sensor nodes 306. This separation between automatic composer nodes 310 and sensor nodes 306 allows for sensor nodes 306 to be mote-like devices rather than full-fledged computers.

An automatic composer node 310 acts as a central manager for a subset of sensor nodes 306, and directs which software modules 308 are instantiated on a respective sensor node 306 and which messages are exchanged among the sensor nodes 306 as determined by a composition. Sensing information required by applications is sent directly from the sensor node 306 that computes the result to the application, which again is specified by automatic composer 310. Automatic composer 310 will also receive messages to maintain the state stored by the sensing needs monitor, the sensing module registry, and the device database. In one embodiment, automatic composer 310 may require relatively high processing power to compute compositions 206 at runtime, and reliable links to sensor nodes 306.

Sensor nodes 306 are the workhorses that have processing capability and have one or more sensing devices associated with them. These nodes have runtime software built into them, which supports the instantiation of software modules 308 and the exchange of messages as directed by the automatic composition service. The runtime software can also have other services built in to detect devices and their relevant calibration and location information so that this information can be sent to the automatic composition service.

In one embodiment of the present invention, a distributed implementation is accomplished by partitioning the sensor nodes 306 into several subsets and having a composer node manage the partitions separately. This distributed implementation is scalable, but may introduce an overlap of sensor coverage and an overlap in sensing needs between neighboring composer nodes that these composer nodes need to resolve.

A Retail Store Example

Figure 4:
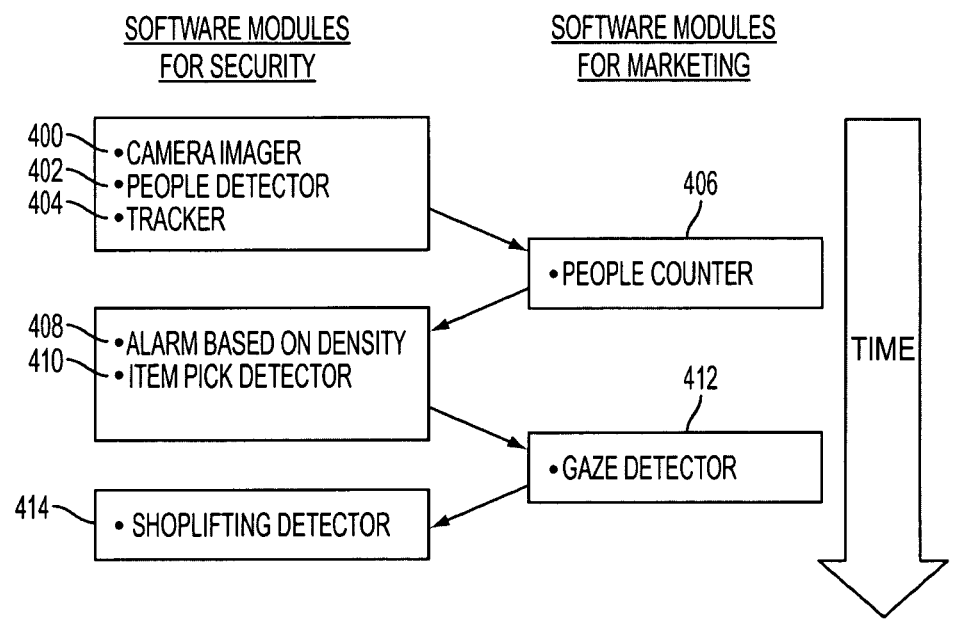
FIG. 4 presents a diagram illustrating an operation flow for how software modules may be extended for multiple applications in accordance with an embodiment of the present invention.

FIG. 4 presents a diagram illustrating an operation of how software modules may be extended for multiple applications in accordance with an embodiment of the present invention. In this embodiment, the sensing system is designed to be extensible, and applicable to multiple simultaneous sensing applications.

An exemplary use for this application is for a security surveillance system and an in-store market research system. These two applications have functionality in common, and they can benefit from a greater density of sensing devices. A potentially more cost-effective alternative to developing multiple simultaneous sensing systems separately is to design the systems so that existing functionality could be easily reused and extended beyond the initially intended use of the application. In the example illustrated in FIG. 4, the retail store is first deployed with a security surveillance system that captures video from cameras (Camera Imager 400). Then, a security application developer (left column) develops a software module with video analytic capabilities such as People Detector 402, to detect the presence of people in the scene, and Tracker 404, to track people over time. Store managers may also wish to leverage this system to extract customer count information throughout a store to help dispatch salespeople accordingly. A different developer, responsible for developing an in-store marketing application (right column), could reuse People Detector 402 functionality originally designed for the security application and extend it into a software module that provides customer counts in a given area (People Counter 406). Furthermore, People Counter 406 module can also be extended for security applications to monitor people in restricted areas. Finally, an Alarm Based On Density 408 functionality can be developed by the security developer to initiate an alarm under pre-determined conditions.

A further example of common functionality is that both applications extract people's behavior. A security guard may be interested in behaviors such as a customer picking up an item. After detecting this behavior, the security guard may monitor this customer to make sure that the customer is not shoplifting. A sales manager may also be interested in detecting customers picking up an item to dispatch a sales agent, and may perform marketing research by detecting whether customers gaze at certain items, since this information indicates the customer's interest as it relates to targeted advertising and correlates with sales. Under this example, if the Item Pick Detector 410 component is designed with possible future reuse in mind, then both applications can benefit. Furthermore, new functionality such as Gaze Detector 412 and Shoplifting Detector 414 can be developed in parallel by security and market research application programmers respectively without having to deploy a new sensor node infrastructure.

Naming Data

Allowing multiple applications to reuse functionality provided by other applications requires a sensing system to employ a common way of referring to data. The physical location and timing information of sensor data is the fundamental context information used by an application to interpret and extract high-level information of an observed phenomenon. This allows a naming system to be employed where all data and extracted information is referenced by name. For example, software modules in a video surveillance tracking system extract information such as "images," "people locations," and "motion trajectories." In one embodiment of the present invention, tagging a respective event identifier with spatiotemporal context information provides a simple way to specify interests in sensing information, namely, name-spatiotemporal context pairs.

<name, location/time>

In an alternate embodiment of the present invention, a phenomenon of interest is represented by name-location pairs, with time being implicitly specified to be the present.

<name, location>

For a given name-location pair, the name indicates the type of data or information, and the location indicates the point or region on which the information is based. For example, <PersonCount, Palo Alto> represents that a sensing information is about the number of people in Palo Alto.

Sample Composition

Figure 5A:
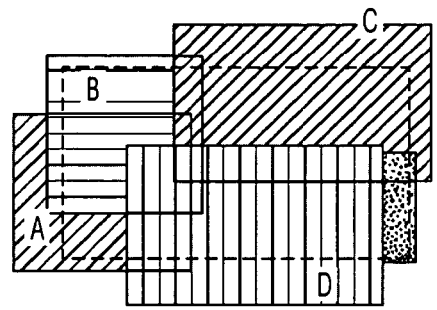
FIG. 5 presents a diagram depicting a sensing need and the coverage provided by a composition of a group of sensors in accordance with an embodiment of the present invention.
Figure 5B:
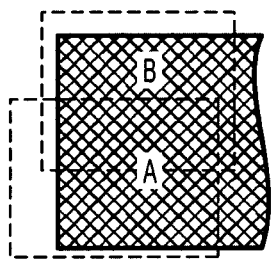
Figure 5C:
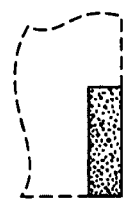

FIG. 5 presents a diagram depicting a sensing need and the coverage provided by a composition of a group of sensors in accordance with an embodiment of the present invention. FIG. 5A illustrates four cameras, A-D, that are attempting to respond to a sensing need. The sensing need is shown as a dashed rectangle. A partial composition is illustrated in FIG. 5B, which presents the portions of a respective camera's field-of-view as is included in the composition. FIG. 5C illustrates a region in the lower right of FIG. 4A that cannot be covered with the current configuration of sensor nodes.

Figure 6:
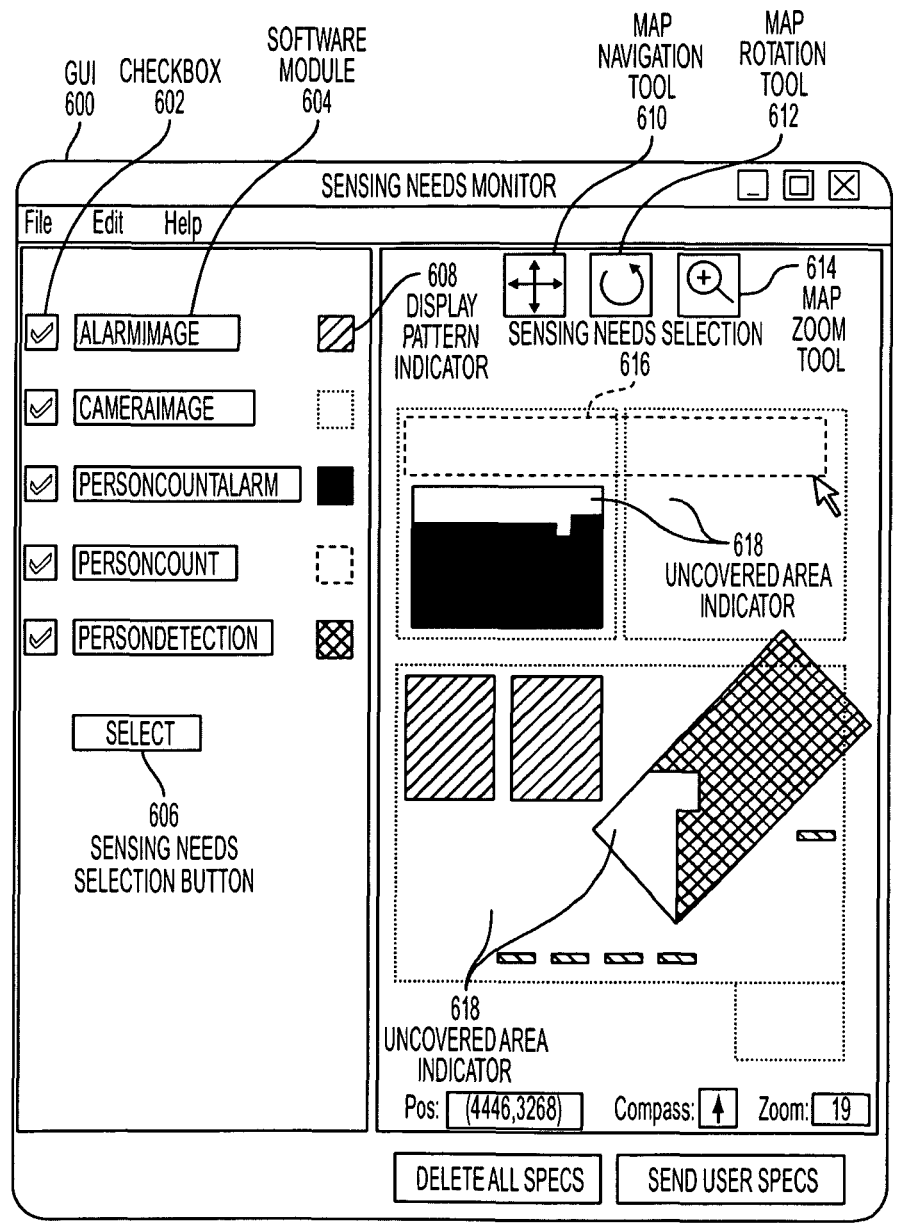
FIG. 6 presents a graphical user interface for a sensing needs monitor in accordance with an embodiment of the present invention.

FIG. 6 presents a graphical user interface (GUI) 600 for a sensing needs monitor in accordance with an embodiment of the present invention. GUI 600 includes two window panes, such that a first window pane presents a list of software modules 604 that can be incorporated into a composition by a user. A respective software module 604 of the first window pane has an associated display pattern indicator 608 and check box 602, such that enabling the associated check box 602 and pressing the sensing needs selection button 606 effectively incorporates the selected software module 604 into the composition 206.

A second window pane of GUI 600 includes a map surface image of the sensed area, a map navigation tool 610, a map rotation tool 612, a map zoom tool 614, a sensing needs selection 616, and an uncovered area indicator 618. The map navigation tool shifts the map image in a given direction as a means to effectively scroll, or navigate, across a map surface. The map rotation tool rotates the map image in a given direction as a means to effectively orient the image in a given direction. The map zoom tool enlarges or diminishes the map surface image as a means to effectively zoom into, or zoom out of, a map surface.

Sensing needs selection 616 illustrates a surface area that has been selected to employ a given type and number of software modules 604. The type of software module 604 that a given sensing needs selection 616 employs is indicated by the border or the shading of sensing needs selection 616, and corresponds to a display pattern indicator 608 of the first window pane. A sensing needs selection 616 that is successfully instantiated due to a proper deployment of sensor nodes is indicated by a dark shaded region. The uncovered area indicator corresponds to the regions of a sensing needs selection 616 that cannot be successfully instantiated due to an under-deployment of sensor nodes, and is indicated by an unshaded region.

FIG. 7 presents a graphical user interface for composition viewer 700 in accordance with an embodiment of the present invention. Composition viewer 700 includes map navigation tool 710, map rotation tool 712, and map zoom tool 714, and further includes a visual display for a directed graph of software modules 708.

The leaf (bottom) boxes of the directed graph indicate software modules 708 that are sensor driver modules; in this case, they are Camera Imager software modules. The root (top) boxes indicate software modules 708 that directly output information corresponding to one of the sensing needs stored in the sensing needs monitor. The internal boxes that interface with other boxes for inputs and outputs are other software modules 708 that compute intermediate results.

Figure 8:
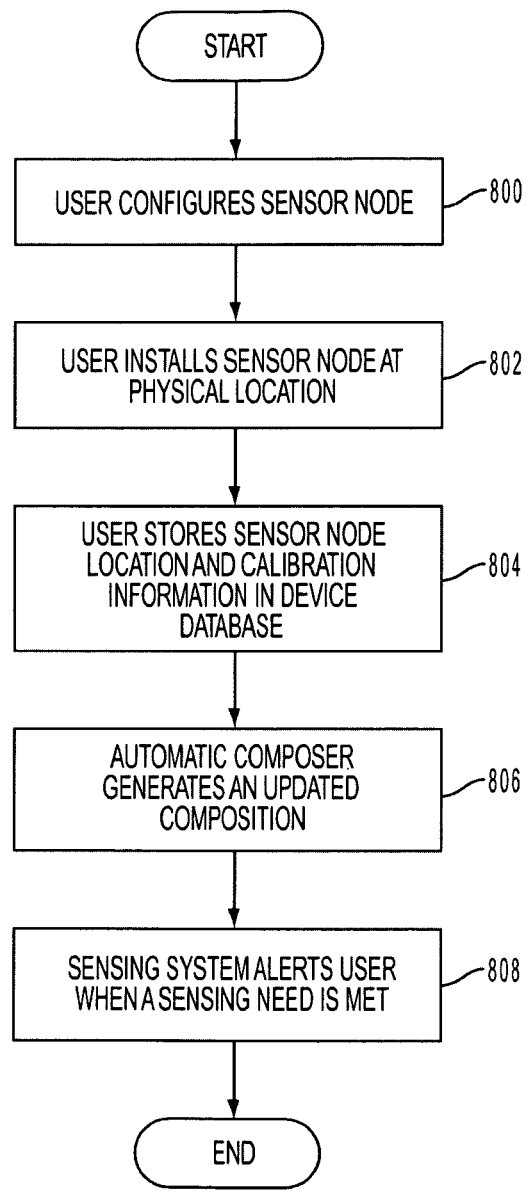
FIG. 8 presents a flow chart illustrating a process for appending a sensor node into a sensing system in accordance with an embodiment of the present invention.

FIG. 8 presents a flow chart illustrating a process for appending a sensor node to a sensing system in accordance with an embodiment of the present invention. To start, the user configures a respective sensor node (operation 800). Next, the user installs sensor node at a physical location (operation 802). In operation 804, the user stores the sensor node location and calibration information in a device database.

Once the device database has updated sensor node information, an automatic composer generates an updated composition to take advantage of the new sensing and processing capabilities (operation 806). The sensing system continues in normal operation as sensor nodes monitor the input from their associated sensing devices and execute the information in software modules. When a sensing need of a user is satisfied, the sensing system alerts the user (operation 808).

Figure 9:
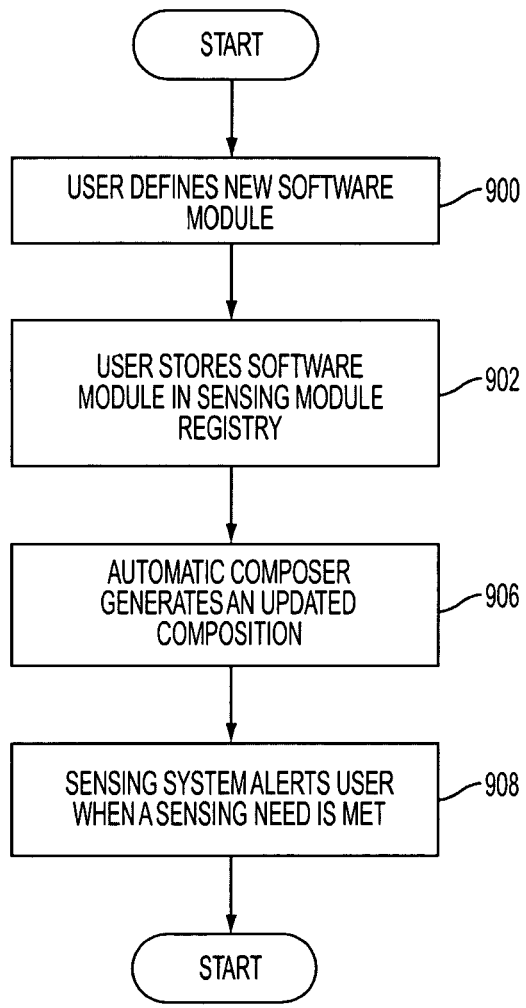
FIG. 9 presents a flow chart illustrating a process for introducing a new software module into a sensing system in accordance with an embodiment of the present invention.

FIG. 9 presents a flow chart illustrating a process for defining a new software module for a sensing system in accordance with an embodiment of the present invention. To start, the user defines a new software module (operation 900). Next, the user stores the new software module in the sensing module registry (operation 902).

Once the sensing module registry has updated the software module information, an automatic composer generates an updated composition to take advantage of the functionality (operation 906). The sensing system continues in normal operation as the sensor nodes monitor the input from their associated sensing devices and execute the information in the software modules. When a sensing need of a user is satisfied, the sensing system alerts the user (operation 908).

Figure 10:
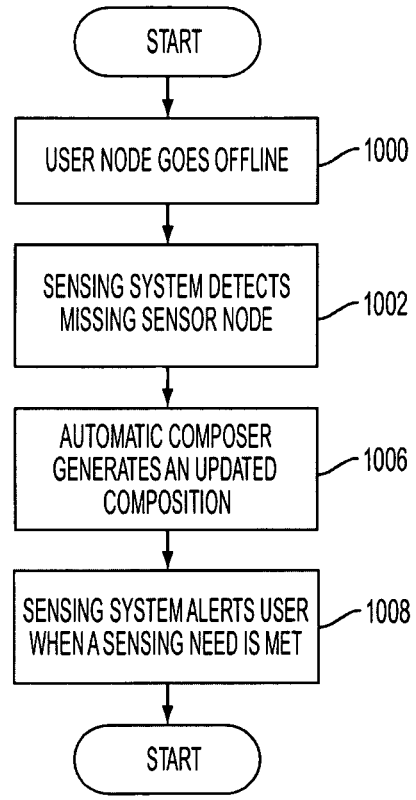
FIG. 10 presents a flow chart illustrating a process for a sensing system recovering from a sensor node that goes offline in accordance with an embodiment of the present invention.

FIG. 10 presents a flow chart illustrating a process for a sensing system recovering from a sensor node that goes offline in accordance with an embodiment of the present invention. When a sensor node goes offline (operation 1000), either intentionally for maintenance purposes or unintentionally due to a malfunctioning sensor node or a malfunctioning sensing device, the sensor system detects the missing sensor node (operation 1002).

Once the device database has updated state information on the deployed sensor nodes which accounts for the missing sensor node, the automatic composer generates an updated composition to use the available sensor nodes and sensing devices (operation 1006). The sensing system continues in normal operation as sensor nodes monitor the input from their associated sensing devices and execute the information in the software modules. When a sensing need of a user is satisfied, the sensing system alerts the user (operation 1008).

Figure 11:
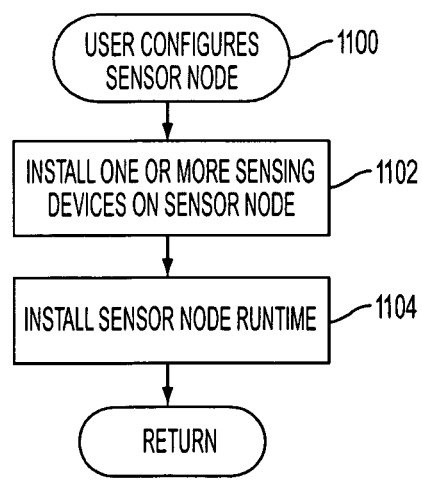
FIG. 11 presents a flow chart illustrating a process for configuring a sensor node in accordance with an embodiment of the present invention.

FIG. 11 presents a flow chart illustrating a process for configuring a sensor node in accordance with an embodiment of the present invention (operation 1100). The user first installs one or more sensing devices on a sensor node, (operation 1102). Then, the user installs runtime software into the sensor node which can instantiate sensing devices and exchange messages as directed by a composition (operation 1104).

Figure 12:
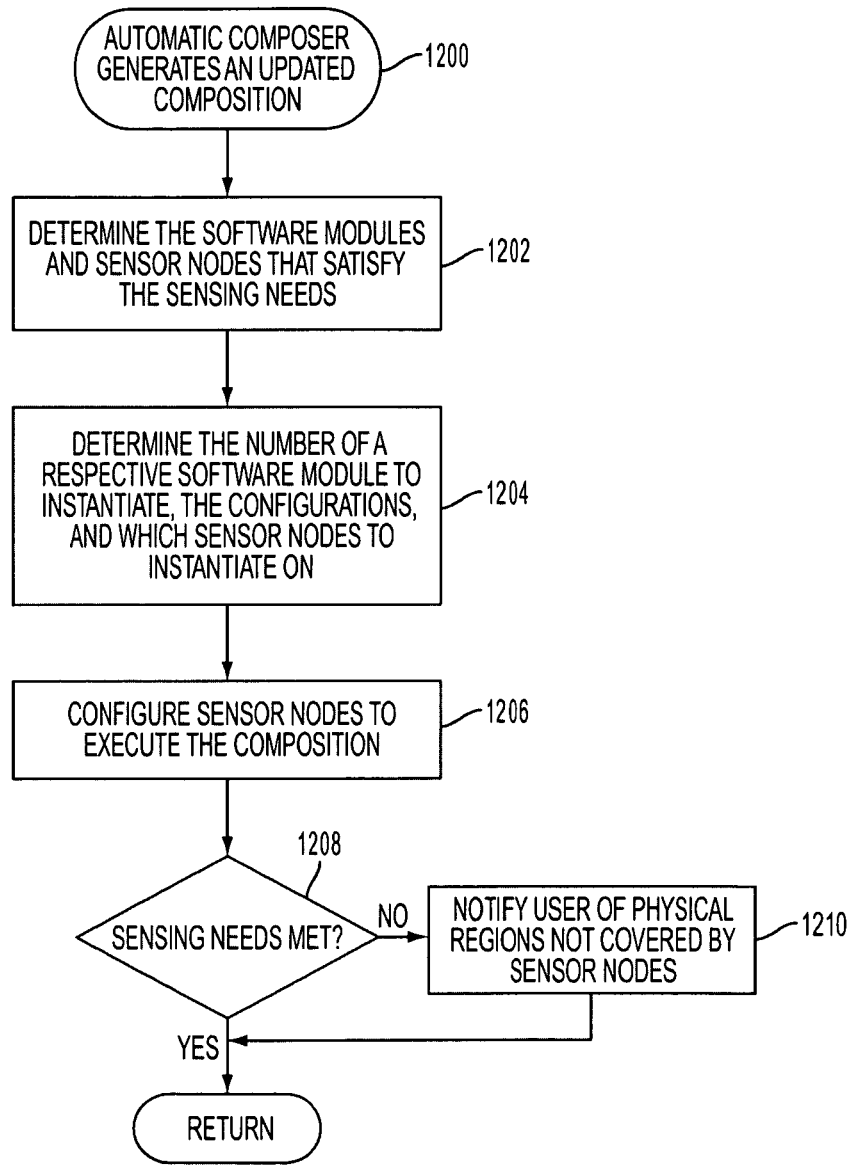
FIG. 12 presents a flow chart illustrating a process for generating a composition in accordance with an embodiment of the present invention.

FIG. 12 presents a flow chart illustrating a process for generating a composition in accordance with an embodiment of the present invention (operation 1200). To begin, an automatic composer determines the software modules and sensor nodes that satisfy the sensing needs (operation 1202). Next, the automatic composer determines the number of a respective software module to instantiate, the configurations, and which sensor nodes to instantiate on (operation 1204). The automatic composer generates a composition by incorporating the information it defines in operation 1204, and configures the sensor nodes to execute the composition (operation 1206).

The automatic composer determines if the user's sensing needs are met in operation 1208. If the user's sensing needs are not being met by the current composition, the automatic composition service notifies the user of the physical regions which are not covered by the current deployment of sensor nodes (operation 1210). In one embodiment of the present invention, the automatic composition service notifies the user of the lack of coverage by displaying the uncovered physical regions in a GUI as light-colored regions (corresponding to uncovered area indicator 618).

Figure 13:
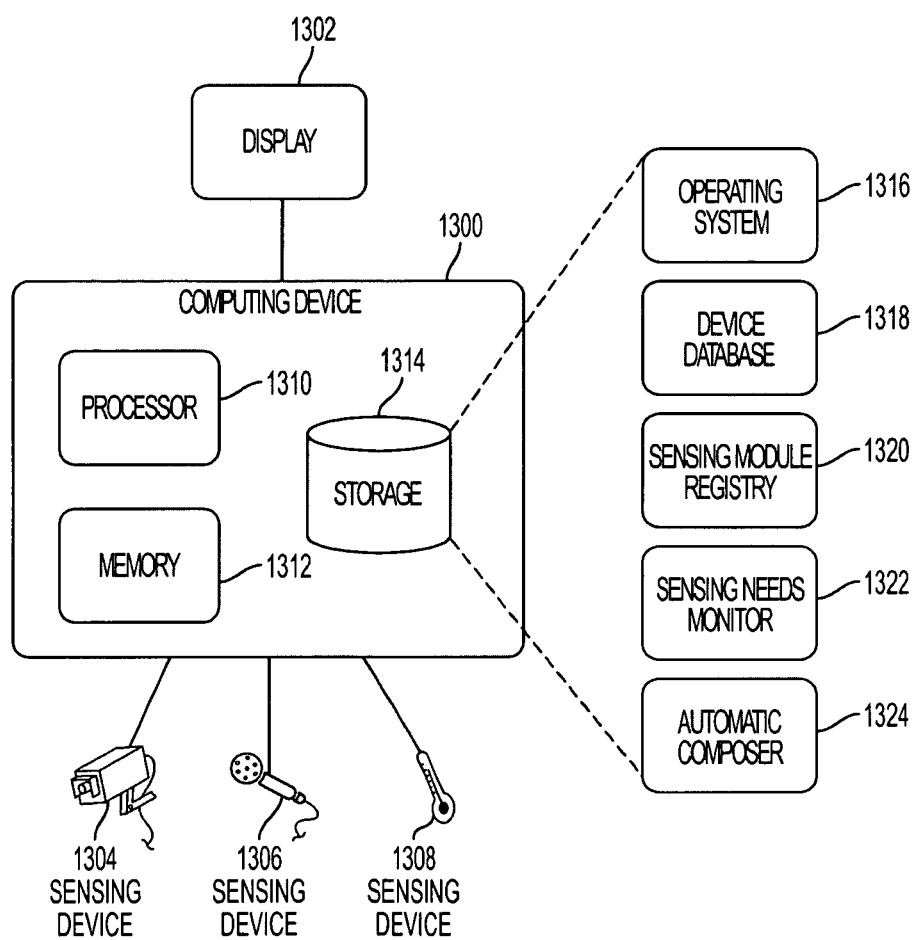
FIG. 13 illustrates an exemplary computing device that facilitates a distributed sensing system in accordance with an embodiment of the present invention.

FIG. 13 illustrates an exemplary computing device 1300 that facilitates a distributed sensing system in accordance with an embodiment of the present invention. Computing device 1300 can generally include any type of computer system based on a microprocessor, a mainframe computer, a digital signal processor, a portable computing device, a personal organizer, a device controller, or a computational engine within an appliance. More specifically, referring to FIG. 13, computing device 1300 includes one or more processors 1310, a memory system 1312, and a storage device 1314. Furthermore, computing device 1300 is configured to interface with display 1302, and a number of sensing devices 1304, 1306, and 1308.

Sensing devices 1304-1308 can include cameras, microphones, motion detectors, ultra-wideband (UWB) sensors, infrared sensors, magnetometers, thermometers, barometers, weight scales, and other types of sensors that detect sound, motion, vibration, luminosity, magnetic field intensity, proximity, pressure, temperature, radiation, timing, humidity, altitude, weight, airborne particulates, velocity, direction, and other properties and/or combinations of properties.

Storage device 1314 can include an operating system 1316, a device database 1318, sensing module registry 1320, a sensing needs monitor 1322, and an automatic composer 1324.

During operation, automatic composer 1324 is loaded into memory 1312 and executed by processor 1310. Automatic composer 1324 then performs the functions described in conjunction with FIG. 2.

Deploying and Extending a Networked Sensing System

The following scenarios describe two applications of the extensible sensor system: a simple security application, and a personalized advertisement application. The security application detects and tracks the movement of people over time, locally stores video feeds tagged with track information, and sends alarms when restricted areas are violated. The personalized advertisement application detects a shopper's profile by reading a radio frequency identification (RFID) card as the shopper enters the store, then tracks the shopper using the cameras. When the shopper approaches a display, the display shows an advertisement relevant to his interests. These scenarios demonstrate the simplicity of extending a sensor system to accommodate the sensing needs of a second application.

Scenario A—Initial Deployment

A security team plans to set up a camera sensing system within a retail store to record video, and to automatically detect and track customers as they move through the store. A total of 15 nodes are installed with a runtime software environment that could instantiate software modules and exchange messages as directed by a composition. Sensor node location and calibration information are measured manually and stored in a device database.

Software development involves decomposing the required sensing tasks into composable modules, generalized over location, and specifying the names of the inputs and outputs. The security team develops a CameraImager sensor driver module that interfaces with a ceiling camera and outputs CameraImage data. The team also develops a PersonDetector module to input CameraImage data and produce PersonDetection information. Finally, a Tracker module is developed to produce PersonTrack information given the PersonDetection information.

The automatic composer needs additional metadata about the software modules, which require defining the outputName, inputPairs, filterInputLocations, is Driver, and inputDeviceType functions. These functions are implemented to provide meta data on a respective software module, and the software modules are implemented to be general over any location region, which provides the automatic composition service with the information that enables it to work.

Once the sensing network infrastructure is established, the next step entails specifying, in the sensing needs monitor, the information that is to be extracted. This involves specifying <name, location> pairs, which are implemented in a GUI as shown in FIG. 6. The different borders and shadings represent different names, and the rectangular regions represent the corresponding location.

Scenario B—Modifying where to Sense

The security team determines that they need to monitor a different area of the retail store. Because the software modules are developed to be general over location, changing the regions to be sensed only involves changing the name-location pairs in the sensing needs monitor. As a result, the automatic composer generates a new composition automatically with no additional user effort.

If the automatic composer determines that insufficient sensor coverage is available, a GUI, such as GUI 600 in FIG. 6, indicates where sensor coverage is lacking. For example, FIG. 6 illustrates areas of insufficient sensor coverage in accordance with an embodiment of the present invention. The lighter areas of the rectangular regions indicate areas of insufficient sensor coverage. This information provides visibility into the sensing system to enable a user to understand the capabilities and limitations of the sensing system.

Scenario C—Addition of New Sensing Devices

To compensate for the lack of sensor coverage, the security team decides to add new sensing devices.

The security team installs the runtime software into a collection of new sensor nodes, they calibrate the sensor nodes, and mount the sensor nodes to the desired locations and with the desired orientations. This calibration and configuration information is inserted into a device database. Then, an automatic composer re-computes a new composition to take advantage of the new sensing and processing capabilities. With the sensor nodes installed and mounted to achieve the desired coverage, the light areas of the rectangular regions in the GUI illustrated in FIG. 6 turn dark. The sensing system automatically utilizes the capabilities of the sensor nodes once the relevant information about the new sensing devices is provided to the automatic composition service.

Scenario D—Extension of Sensing Outcomes

The retail store wishes to use the cameras installed in the store for market research purposes. The current capabilities of the sensing system can be leveraged, but they wish to add new functionality, such as counting the number of people in specific areas.

The store owner develops new software to incorporate this people counting capability into the sensing system. To understand the types of information currently supported by the system, the store owner lists the supported output names. The store owner then chooses to implement a single module, entitled PersonCounter, which inputs "PersonDetection" and outputs "PersonCount." Note that the store owner does not have to know that a "PersonDetection" is computed from a "CameraImage" in the system, which is a benefit of naming. A further advantage of naming is that future upgrades, additions, or replacements of downstream modules can be configured to use or feed the PersonCounter module. For example, person detections could be computed by microphone arrays with software to detect and localize speech. As long as the microphone-based detection module outputs "PersonDetection," the PersonCounter module can use that information to extract "PersonCount" information.

As before, the PersonCounter is implemented to be general over any location region and is programmed with the metadata that is necessary for automatic composition to work. Inserting software modules into a sensing module registry, such as the PersonCounter module, does not require the sensing system to be taken offline. This is important for applications where it is highly desirable that the sensing system is running continuously, such as security.

The final step is to add name-location pairs into the sensing needs monitor to have the sensing system output "PersonCount" information. This causes a recomposition to occur, and the sensing system reconfigures itself accordingly.

Scenario E—Robustness to Node Failures

When a node failure is detected, automatic composition enables graceful degradation by triggering a re-composition using only the available devices; if sufficient redundant coverage exists, full functionality is restored without requiring any user action.

Requirements for Extensible Sensing Systems

To enable extensibility in sensing systems, two perspectives are considered: that of an original developer and that of a developer (extender) who intends to reuse or extend existing functionalities. Note that oftentimes the developers of the initial system are not the same as extenders. The following paragraphs outline the requirements that facilitate the effort of an original developer and an extender.

Initial Developer's Perspective

For functionality on a sensing system to be reused or extended, the functionality is designed using the following guidelines: (1) functionality is designed into fine-grained modules that can be invoked independently; and (2) functionality is made general enough to be reusable. However, from the developer's point of view, designing for extensibility is relatively low priority. Although extensibility is considered a good feature, the first and foremost priority is to implement the intended functionality of the system. If the extra effort to generalize algorithms and package them into modules incurs significant additional complications to the design, simplicity wins out in the short term even though the extensible design could mean a better system over its lifetime. Hence, simplicity requirements are taken into account, and are listed below.

Requirement 1a: Packaging functionality into modular, independently invokable units should require minimum extra effort.

Requirement 1b: Developing generalized algorithms should require minimum extra effort.

The retail store example implicitly describes a component-based architecture where a respective software module is a black box with specified inputs, outputs, and control parameters. The PeopleDetector functionality accepts images as input, and its parameters include the specification of the area where people need to be detected. It outputs a set of people descriptors (contour, bounding box, mask pixels, etc.).

Extender's Perspective

Simplifying an extender's job of reusing and extending the existing software modules also requires the adoption of new development practices, which are listed below.

Requirement 2a: Discovering what software modules exist and what their input/output/parameters are should be as easy as possible.

Requirement 2b: The use of existing software modules should not require specialized expertise.

Requirement 2c: Integrating software modules should be as simple as wiring to match inputs and outputs.

Requirement 2d: Updating existing software modules with new versions and adding new modules should be fully supported.

In the retail store scenario, for an in-store market research application developer to extend a module, it should be easy for him to determine which software modules are available in the overall system. The distinction of whether a software module is developed by the security developer or market research developer is unimportant. The discovery of which software modules are available should be nearly effortless for the developer (Requirement 2a). Secondly, the developers for the two applications may have different domain expertise. For instance, developers developing the security applications may be computer vision specialists, while developers developing the marketing application may be sales experts. It is important that the relevant knowledge of how to use sensing devices, sensing algorithms, their capabilities, and their limitations are all packaged so that non-experts can use the outputs of these algorithms correctly (Requirement 2b).

Requirement 2c corresponds to integration. Consider PeopleDetection and PeopleCounter components as examples. Although they are developed for different applications, integration should be effortless. The PeopleDetection component takes images as input and outputs people descriptors in a specified region, while PeopleCounter takes people descriptor as input and outputs total counts of customers in a region. This simple example demonstrates that the two components can be integrated by matching the outputs of a first software module with the inputs of a second software module. In practice, with large numbers of software modules and data types, interfacing these software modules can become a massively complicated manual task. Therefore, a well-defined set of matching rules allows integration to be automated, which is the purpose of the automatic composition service.

A valuable side-benefit of an extensible system is that its functionality can be modified over time; therefore, it is critical that incremental updates are fully supported without breaking upstream functionalities (Requirement 2d).

Meeting the Requirements

The role of a developer that extends the functionality of an existing sensing system is simplified as follows. First, the developer is provided with the available functionalities of the existing system through a list of names that indicate the type of information the existing sensing system can detect. Second, this information can be extracted from any location region by specifying a name-location pair, as long as there is sufficient sensor coverage in the region of interest. And third, the present invention comprises an automatic composition service with the capability to report insufficient sensor coverage.

The role of an initial developer is simplified as follows. The present invention uses a component-based development framework that ensures all functionality is packaged into independently executable software modules that can be linked with one another. Second, the development framework requires all software modules to be developed in a manner that is generalizable over location. This is important because the physical location of sensor nodes is critical context information for interpreting sensor data, and it is not until an actual deployment of the system that device locations are established. For example, when developing an image processing routine that outputs the detections of people, a software module should be able to extract the detections of people within any given physical region.

Finally, the role of both an initial developer and that of an extender is simplified as follows. Integration of functionality is handled automatically by the automatic composition service. Knowledge of the names of inputs and outputs of the software modules and knowledge of the type and location of the deployed sensor nodes enables the automatic composer to automatically instantiate, set location parameters, and interface the software modules with one another so as to realize the sensing needs of users and applications.

The automatic composer provides an abstraction for the possible configurations of software modules. With automated integration capability, the perceived complexity of sensing system scales linearly with the number of software modules, rather than exponentially with the number of possible configurations of software modules. Thus, automatic composition is the key capability that maintains simplicity in the design methodology for extensible systems.

Impact to Extensibility

Requirement 1a—The implicit dependencies of a software module should be hidden as much as possible to facilitate a future developer to reuse the functionality. Since the dependencies are best known by an original developer of the software module, the original developer can provide context meta data about inputs and outputs of a software module. This meta-data can then be used by the automatic composition service to integrate this functionality into the sensing system. The original developer is essentially packaging the software module into a form which captures all of this module's dependencies via names. The effect of naming is to decouple the software modules from one another so that a developer never has to know exactly which software module provides the desired named data, only that the system can provide it. The complications in tracking hidden dependencies are avoided by automating integration with the automatic composition service.

Requirement 1b—Sensing algorithms should be developed to be general over location regions. This puts extra effort on the developer; however, the gains of the extra effort include being flexible over variations in the locations of sensor node deployments and allowing developers of future software modules to build on existing functionality over any location.

Requirement 2a—To learn what the current sensing capabilities of an existing system are, the developer only needs to know what names are known by the sensing system and what the semantics are. Other details like the data representation of the information will also be needed to reuse this information programmatically in a new software module.

Requirement 2b—To use an existing sensing capability, the developer expresses an interest for sensing information by entering a name-location pair into the sensing needs monitor. The simplicity of this specification, on the one hand, limits how the software modules can be interfaced, but on the other hand, a future developer does not need to have any specialized expertise to use the software modules.

Requirement 2c—Integrating a new software module requires specifying the input-output meta data and registering the software module with an automatic composition service. Instantiation of multiple copies of the software modules over distributed devices and configuring the interfaces with interdependent modules are performed automatically by the automatic composition service. This means that developers do not have to write and integrate new functionality into an existing sensing system. Furthermore, developers do not have to worry about inadvertently breaking the interfaces between the software modules because the automatic composition service automatically generates a re-composition of software modules that meets all the sensing needs of the application with the inclusion of the new software module.

Requirement 2d—Updating existing functionality is accomplished by replacing a software module that outputs a particular name with a new version that outputs the same name in the sensing needs monitor. Integration of the new version is performed automatically by the automatic composition service.

Benefits of Online Re-Composition

In one embodiment, the automatic composition service is developed to respond to state changes within the sensing needs monitor, the sensing module registry, and the device database. By re-computing a new composition during online operation, the sensing system exhibits additional benefits beyond extensibility without requiring any more effort by developers.

Adaptability—Adaptability refers to the ability of a sensing system 100 to adjust its processes in response to changes in needs by the user or application. This corresponds to re-computing a new composition in response to state changes in the sensing needs monitor.

Extensibility—The functionality of a sensing system can be extended without downtime since a real-time re-composition can be performed in response to state changes in the sensing module registry.

Robustness—A sensing system is robust to sensor node failures. If the device database is able to detect a sensor node or sensing device failure, a re-composition is performed to satisfy the sensing needs to the extent possible with the remaining sensor nodes and sensing devices.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enabling extensibility in a sensing system, the method comprising:
   maintaining physical information, by a device database, on at least one deployed sensor node, wherein the physical information describes sensor-specific calibration information;
   maintaining a sensing module registry, wherein the sensing module registry includes a number of software modules that are available for extracting information from sensor data received from the at least one deployed sensor node;

maintaining a set of context pairs, wherein a respective context pair represents a sensing need of a user or a sensing application;

in response to state changes within the sensing module registry, generating a directed graph that represents data flow among deployed sensing devices and software modules, wherein the directed graph comprises a plurality of graph nodes that each represents an instance of a software module deployed on a sensor node, and further comprises one or more edges that each connects a first graph node to a second graph node to represent a configured interface of an output from a first software module instance to a second software module instance;

in response to the set of context pairs changing:

determining a set of graph nodes that satisfy a plurality of sensing needs associated with the set of context pairs, wherein a graph node corresponds to a sensor node that satisfies a respective sensing need represented by a context pair; and generating, based on the set of graph nodes, a composition of software module instances that are each deployed on a corresponding sensor node to extract information from the distributed sensor data, wherein the composition of software module instances satisfies the plurality of sensing needs of the user or the sensing application.

2. The method of claim 1, further comprising detecting at a sensor node one or more of: a sound signal, motion signal, vibration signal, altitude signal, luminous intensity signal, proximity signal, pressure signal, temperature signal, radiation signal, timing signal, humidity signal, electromagnetic field intensity signal, weight signal, airborne particulates signal, velocity signal, direction signal, and distance signal.

3. The method of claim 1, further comprising reporting, at the automatic composer, when an existing sensor node configuration does not provide sufficient sensor coverage for realizing the sensing requirements of users and applications.

4. The method of claim 1, wherein a respective context pair represents sensing information as a name-location pair of the form:

<name, location>;

wherein the "name" field indicates a type of data or information on which the sensing information is based; and
wherein the "location" field indicates a point or region on which the sensing information is based.

5. The method of claim 1, wherein a respective context pair represents sensing information as a name-spatiotemporal pair of the form:

<name, location/time>;

wherein the "name" field indicates a type of data or information on which the sensing information is based; and
wherein the "location/time" field indicates a point or region, and a time, on which the sensing information is based.

6. The method of claim 1, further comprising interfacing between the sensing needs monitor and a graphical user interface (GUI); and
wherein the GUI is configured to allow users to insert and delete context pairs.

7. The method of claim 1, wherein generating the composition of software modules comprises:

determining a set of software modules that achieve the sensing needs;
determining, for a respective type of software module, one or more sensor nodes on which to instantiate the respective type of software module;
determining a configuration for a respective instance of a software module; and
deploying the composition of software modules, which involves configuring a respective sensor node to execute one or more software module instances assigned to the sensor node based on the configuration of the software module instances.

8. The method of claim 1, wherein when a sensor node failure is detected, the method further comprises generating a new composition of software modules, at runtime, using only sensor nodes that are available for the new composition.

9. The method of claim 1, wherein the physical information includes lens distortion coefficients, a camera orientation, or a location of a deployed sensor node.

10. The method of claim 1, further comprising deleting a respective node of the directed graph that does not contribute to satisfying a sensing need from the directed graph.

11. A distributed sensing system, comprising:
one or more processors;
a memory;
a set of deployed sensor nodes;
a device database implemented by at least one of the one or more processors configured to maintain physical information in the memory for at least one deployed sensor node;
a sensing module registry implemented by at least one of the one or more processors configured to maintain a registry in the memory of one or more software modules that are available for extracting information from sensor data received from a deployed sensor node;
a sensing needs monitor implemented by at least one of the one or more processors configured to maintain a set of context pairs in the memory, wherein a respective context pair represents a sensing need of a user or a sensing application; and
an automatic composer implemented by at least one of the one or more processors configured to:
in response to state changes within the sensing module registry, generate a directed graph that represents data flow among deployed sensing devices and software modules, wherein the directed graph comprises a plurality of graph nodes that each represents an instance of a software module deployed on a sensor node, and further comprises one or more edges that each connects a first graph node to a second graph node to represent a configured interface of an output from a first software module instance to a second software module instance;
in response to the set of context pairs changing:
determine a set of graph nodes that satisfy a plurality of sensing needs associated with the set of context pairs, wherein a graph node corresponds to a sensor node that satisfies a respective sensing need represented by a context pair; and
generate, based on the set of graph nodes, a composition of software module instances that are each deployed on a corresponding sensor node to extract information from the distributed sensor data, wherein the composition of software module instances satisfies the plurality of sensing needs of the user or the sensing application.

12. The distributed sensing system of claim 11, wherein a respective sensor node comprises one or more sensing devices to detect one or more of: a sound signal, motion signal, vibration signal, altitude signal, luminous intensity signal, proximity signal, pressure signal, temperature signal, radiation signal, timing signal, humidity signal, electromagnetic field intensity signal, weight signal, airborne particulates signal, velocity signal, direction signal, and distance signal.

13. The distributed sensing system of claim 11, wherein the automatic composer is further configured to report when an existing sensor node configuration does not provide sufficient sensor coverage for realizing the sensing requirements of users and applications.

14. The distributed sensing system of claim 11, wherein a respective context pair represents sensing information as a name-location pair of the form:

<name, location>;

wherein the "name" field indicates a type of data or information on which the sensing information is based; and wherein the "location" field indicates a point or region on which the sensing information is based.

15. The distributed sensing system of claim 11, wherein a respective context pair represents sensing information as a name-spatiotemporal pair of the form:

<name, location/time>;

wherein the "name" field indicates a type of data or information on which the sensing information is based; and wherein the "location/time" field indicates a point or region, and a time, on which the sensing information is based.

16. The distributed sensing system of claim 11, wherein the sensing needs monitor is configured to interface with a graphical user interface (GUI); and wherein the GUI is configured to allow users to insert and delete context pairs.

17. The distributed sensing system of claim 11, wherein the physical information maintained by the device database describes sensor-specific calibration information, which includes lens distortion coefficients, a camera orientation, or a location of a deployed sensor node.

18. The distributed sensing system of claim 11, wherein the automatic composer is further configured to generate a composition of software modules, at runtime, to realize the plurality of sensing needs of the user or the sensing application by:

determining a set of software modules that achieve the sensing needs;

determining, for a respective type of software module, one or more sensor nodes on which to instantiate the respective type of software module;

determining a configuration for a respective instance of a software module; and deploying the composition of software modules, which involves configuring a respective sensor node to execute one or more software module instances assigned to the sensor node based on the configuration of the software module instances.

19. The distributed sensing system of claim 11, wherein when a sensor node failure is detected, the automatic composer is configured to generate a new composition of software modules, at runtime, using only sensor nodes that are available for the new composition.

20. The system of claim 11, wherein the automatic composer is further configured to delete a respective node of the directed graph that does not contribute to satisfying a sensing need from the directed graph.

* * * * *